United States Patent [19]

Harrison et al.

[11] Patent Number: 4,644,139
[45] Date of Patent: Feb. 17, 1987

[54] LAMINATED OBSCURATION BANDED WINDOWS FOR VEHICLES

[75] Inventors: Peter J. Harrison, Solihull; Derek C. Castle, Halesowen, both of England

[73] Assignee: Pilkington Brothers P.L.C., St. Helens, England

[21] Appl. No.: 807,673

[22] Filed: Dec. 11, 1985

[30] Foreign Application Priority Data

Dec. 18, 1984 [GB] United Kingdom ............... 8431894

[51] Int. Cl.⁴ ..................... H05B 3/06; B32B 31/00; H01C 1/012
[52] U.S. Cl. .................................. 219/522; 219/203; 219/543; 219/547; 52/171; 338/309; 29/611; 156/273.9
[58] Field of Search ............... 219/203, 522, 543, 547; 338/309; 156/273.9; 52/171; 29/611

[56] References Cited

U.S. PATENT DOCUMENTS 4,373,130  2/1983  Krasborn et al. .................... 219/203
4,388,522  6/1983  Boaz .................................... 219/522
4,453,669  6/1984  Karla et al. ..................... 237/12.3 R Primary Examiner—E. A. Goldberg
Assistant Examiner—Gerald E. Preston
Attorney, Agent, or Firm—Burns, Doane, Swecker & Mathis

[57] ABSTRACT

A laminated window for a vehicle, for example a windshield, has electrical conductors carried between the plastics interlayer and one of the glass sheets. An obscuration band is fired on to the margin of the inner surface of the outer glass sheet, which obscures from external view conductive strips near the edges of the window.

5 Claims, 4 Drawing Figures

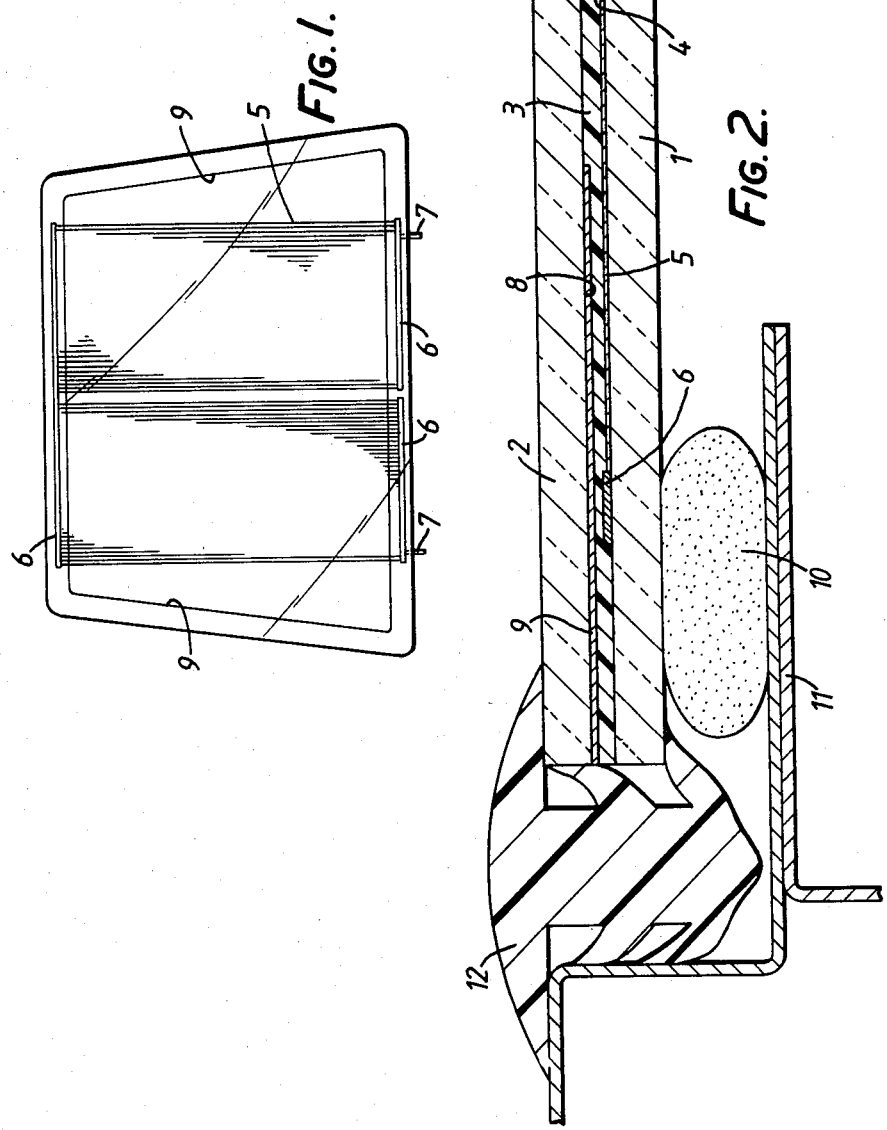

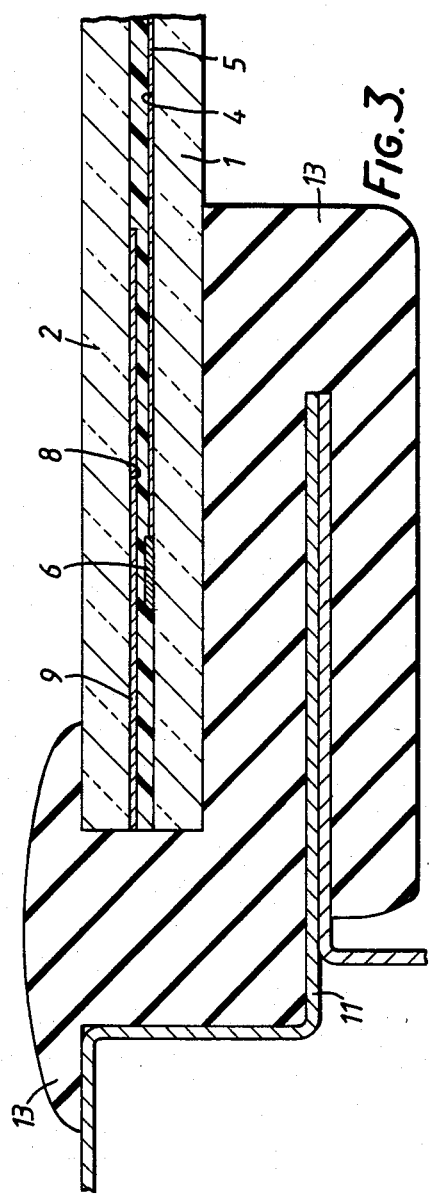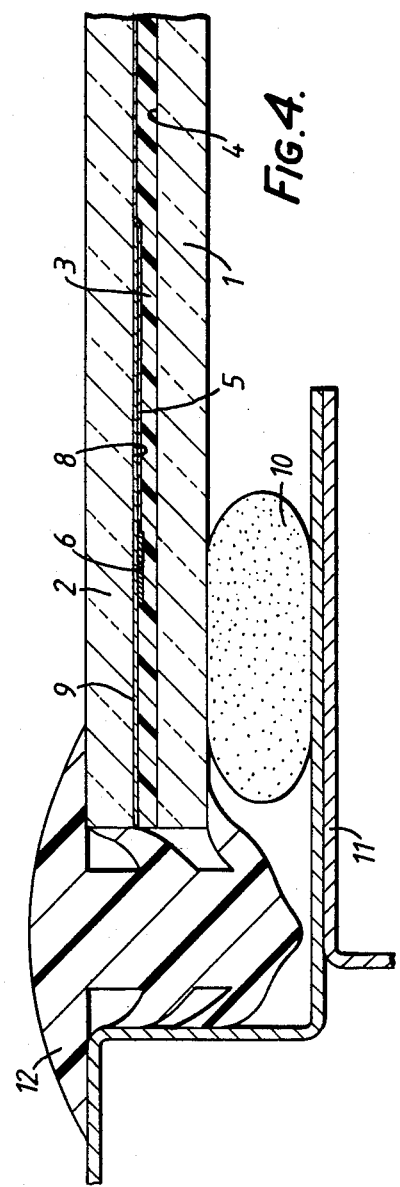

LAMINATED OBSCURATION BANDED WINDOWS FOR VEHICLES

This invention relates to laminated windows for vehicles and in particular to a laminated window, such as a windshield, comprising inner and outer glass sheets which are laminated together with a plastics interlayer, and with electrical conductors incorporated in the laminate and an obscuration band fired around the margin of one of the glass sheets.

BACKGROUND OF THE INVENTION

Such electrical conductors are known and are usually in the form of a grid of heating wires extending between conductive strips, for example as described in GB Pat. No. 972,453 and GB Pat. No. 1,183,316. In another construction the conductors may be conductive strips and a heating film coated onto the glass surface and extending between the conductive strips.

It is common practice for automobile windshields to have an obscuration band which is usually black, fired to a marginal band of the windshield. In a laminated windshield this band is usually carried around the margin of the inner surface of the inner glass sheet, that is the surface of the glass which is exposed inside the vehicle when the windshield has been fitted. This obscuration band hides from external view the flange on the car frame to which the windshield is usually adhered, and hides any adhesive or any other securing means which lie behind the periphery of the windshield. When manufacturing a laminated windshield the obscuration band is painted onto the appropriate glass surface when the glass is cold and is fired onto that surface when the glass passes through the sag bending furnace as one of a pair of glass sheets which are sag bent together prior to lamination.

During sag bending the surface of the glass which carries the obscuration band has to be uppermost in order to avoid problems with smudging or sticking of the paint. Since it has been customary to laminate the glass sheets together in the same order as that in which they are sag bent, this is not inconvenient since it results in the obscuration band being carried on the inner surface of the windshield.

GB Pat. No. 2,078,169 discloses reversing the order of two glass sheets after bending and before laminating in cases where the sheets have different physical-chemical properties and/or different thicknesses. There is no disclosure in GB Pat. No. 2,078,169, however, of the provision of electrical conductors and obscuration bands.

When electrical conductors are incorporated in the laminate they are usually carried between one of the glass sheets and the interlayer. Conventionally therefore the conductive strips extending along opposite edges of the windshield, usually near the top and bottom of the windshield, are not obscured from external view by the obscuration band.

OBJECTS AND SUMMARY OF THE INVENTION

It is an object of the present invention to improve the construction of a laminated window whose glass sheets have been bent by a sag bending process, in such a way that any conductive strips such as supply conductors or busbars are obscured from external view by the obscuration band, thereby, for example, improving the appearance of a fitted windshield and allowing a very narrow edge trim around the windshield periphery, or in some cases avoiding the use of an edge trim.

According to the invention there is provided a laminated window for a vehicle comprising inner and outer glass sheets which have been bent as a matching pair and then laminated together with a plastics interlayer with the order of the glass sheets reversed, and with electrical conductors incorporated in the laminate and an obscuration band fired around the margin of one of the glass sheets, characterised in that the obscuration band is fired on the inner surface of the outer glass sheet.

The electrical conductors may include conductive strips near to edges of the window, the obscuration band being of sufficient extent to obscure the conductive strips.

The electrical conductors may be carried between the interlayer and the surface of the inner glass sheet which is bonded to the interlayer. Alternatively the electrical conductors may be carried between the interlayer and the surface of the outer glass sheet which is bonded to the interlayer.

The invention also comprehends a method of manufacturing a laminated glass window of the invention, comprising sag bending the two glass sheets together with the eventual inner surface of the outer glass sheet carrying the obscuration band uppermost, allowing the glass sheets to cool, providing an array of electrical conductors on the convex suface of the inner glass sheet, placing the plastics interlayer over the conductors, then placing the outer sheet on the interlayer with the obscuration band contacting the plastics interlayer, and bonding the glass sheets to the interlayer.

The invention further comprehends a method of manufacturing a laminated window for a vehicle, comprising sag bending the two glass sheets together with the eventual inner surface of the outer glass sheet carrying the obscuration band uppermost, allowing the glass sheets to be cool, placing the plastics interlayer over the inner glass sheet, providing an array of electrical conductors on the convex surface of the interlayer, then placing the outer sheet on the interlayer with the obscuration band contacting the interlayer, and bonding the glass sheets to the interlayer.

BRIEF DESCRIPTION OF THE DRAWINGS

Some embodiments of the invention will now be described, by way of example, with reference to the accompanying drawings in which:

FIG. 1 is a view, from the concave side, of a laminated glass windshield according to the invention, FIG. 2 is a cross-section through an edge of the laminated glass windshield of FIG. 1 shown fitted to a vehicle, FIG. 3 is a cross-section, similar to FIG. 2, showing another way of fitting the windshield to a vehicle, and FIG. 4 is a cross-section similar to FIG. 2 showing another embodiment of the invention.

DETAILED DESCRIPTION

A laminated windshield for a vehicle is illustrated in FIGS. 1 and 2, which comprises an inner glass sheet 1 and an outer glass sheet 2 which are laminated together with a plastics interlayer 3, usually polyvinylbutyral, in conventional manner. The outer surface 4 of the inner glass sheet carries an array of heating wires 5, for example tungsten heating wires of diameter 0.015 mm or 0.02 mm. The heating wires extend vertically across the windshield between tinned-copper conductive strips or busbars 6 which extend near to the upper and lower edges of the windshield. Terminals 7 located at the bottom of the windshield in conventional manner are respectively connected to the busbars 6. The arrangement illustrated connects two banks of heating wires 5 in series. Other arrangements may be used, for example a single bank of heating wires, or two banks connected in parallel.

The inner surface 8 of the outer glass sheet 2 carries an obscuration band 9 which is fired onto that surface during the sag bending process in the manner to be described.

The windshield is secured in position by adhesive 10 to a vehicle flange 11, and a trim 12 of conventional design is fitted around the windscreen.

Because the obscuration band 9 is on the inner surface 8 of the outer glass sheet 2 any electrical conductors such as the busbars 6, are obscured from external view by the band 9 which is of sufficient width to obscure the adhesive 10 and the vehicle flange 11 as well. The appearance of the vehicle is thereby improved.

In manufacturing this windshield the two sheets of glass are sag bent together as a pair supported on a cradle with the eventual inner glass sheet 1 lowermost. The glass sheet 2 which is to be the outer glass sheet in use is placed on top of the glass sheet 1 and the obscuration band 9 will have been printed, using a suitable ink, on to the uppermost surface of the sheet 2, that is the surface 8.

The assembly of glass sheets passes through the sag bending furnace and during heating the sheets sag under gravitational force and become bent as a matching pair, and the ink of the obscuration band 9 is fired onto the margin of the uppermost surface of the glass assembly.

When the glass is cool the sheets are lifted from the sag bending cradle, the order of the glass sheets is reversed and the sheets are assembled together for lamination. An array of electrial conductors is provided on the convex surface of the inner glass sheet by laying the array of heating wires 5 on the surface 4, which is now a convex surface, and then laying the tinned-copper strips 6 over the ends of the wires 5 to form two parallel banks of wires 5 which are connected together in series, as shown in FIG. 1, with the terminals 7 projecting beyond the edge of the sheet 1.

The plastics interlayer 3 is then placed over the wires 5 and the outer glass sheet 2 is placed on the interlayer 3 with the obscuration band 9 contacting the interlayer 3. A spray of interlayer material dissolved in chloroform may be used to assist in holding the wires 5 in position while this assembly is being carried out.

Lamination then takes place either in conventional manner, or, when the shape of the windshield makes lamination more difficult, the edge of the laminate is surrounded by a holding ring through which air can be withdrawn in the manner described in GB Pat. No. 1,470,959. This assists lamination of the glass surfaces 4 and 8 to the plastics interlayer bearing in mind that the surface 4 carries the heating wires 5, or a heating film, as well as the busbars 6, and the surface 8 carries the obscuration band 9.

FIG. 3 shows another way of fitting the windshield to a vehicle, in which a shaped rubber gasket 13 is fitted around the periphery of the windscreen and also fits on to the vehicle flange 11. The gasket 13 is at least partly obscured by the obscuration band 9, and would be completley obscured if the gasket were slightly narrower than as illustrated in FIG. 3.

Another embodiment of the invention is illustrated in FIG. 4, which illustrates a windshield fitted in the same way as that of FIG. 2. The electrical conductors 5 are carried between the interlayer 3 and the inner surface 8 of the outer glass sheet 2, which is bonded to the interlayer 3. This windshield is manufactured by sag bending the two glass sheets together in the same way as described with reference to FIGS. 1 and 2. The plastics interlayer is placed over the inner glass sheet. The array of electrical conductors is produced separately by soldering the busbars 6 to the parallel wires 5. This array is then placed on the convex surface of the interlayer 3, and the outer glass sheet 2 is then placed on the interlayer 3 with the obscuration band 9 overlying the busbars 6. Lamination then takes place to bond the glass sheets to the interlayer.

The electrical conductors may include a conductive heating film, for example a sputtered film of indium/tin oxides, which is coated onto one surface of one of the glass sheets, for example the inner surface 8 of the outer glass sheet 2, and conductive strips 6 which are in electrical contact with opposite edges of the film.

One way of manufacturing this construction is by printing the obscuration band 9 on to the uppermost surface 8 of the sheet 2, as already described, and then printing the conductive strips 6 on top of the band using an electrically conductive ink. The assembly of glass sheets then passes through the sag bending furnace, and the obscuration band 9 and the conductive strips 6 are fired on to the surface 8.

The conductive heating film is applied to the glass surface 8 after the glass sheets 1 and 2 have been bent, and extends over the inner edge of the obscuration band 9 and on to the conductive strips 6. The strips 6 are completely obscured from external view by the obscuration band 9.

The invention thus provides a laminated glass window which may be a heated windshield, whose appearance is not affected by the presence of an electrical conductor or conductors near to the side edges of the windscreen.

The invention can be applied to any other suitable laminated window for a vehicle, for example a rear window for a vehicle.

We claim:

1. A laminated window for a vehicle comprising inner and outer glass sheets laminated together with a plastics interlayer, wherein:

the inner surface of the outer glass sheet has a marginal obscuration band which has been fired on said inner surface during sag bending of said inner and outer glass sheets with said outer glass sheet resting on said inner glass sheet, said inner surface uppermost and a printed obscuration band around said inner surface, the order of the said inner and outer glass sheets then having been reversed for lamination so that said obscuration band is in contact with said plastics interlayer;

electrical conductors are incorporated in the laminate in contact with said plastics interlayer, said electrical conductors including conductive strips near to edges of said window; and said obscuration band is of sufficient extent to obscure said conductive strips when viewed from the outside.

2. A laminated window as claimed in claim 1, wherein the electrical conductors are carried between the interlayer and the surface of the inner glass sheet which is bonded to the interlayer.

3. A laminated window as claimed in claim 1, wherein the electrical conductors are carried between the interlayer and the surface of the outer glass sheet which is bonded to the interlayer.

4. A method of manufacturing a laminated window for a vehicle, said window comprising inner and outer glass sheets which are laminated together with a plastics interlayer with electrical conductors incorporated in the laminate, the method comprising:

printing an obscuration band around the margin of the uppermost surface of a first glass sheet, which first glass sheet is to become the eventual outer sheet of the laminated window, and which printed surface having the obscuration band is to become the inner surface of that eventual outer sheet;

placing said first glass sheet on top of a second glass sheet, which second glass sheet is to become the eventual inner glass sheet of the laminated window, with said printed surface of the first glass sheet being uppermost and exposed;

heating the so assembled glass sheets in a sag bending furnace to fire the printed obscuration band on to said exposed uppermost surface of the first glass sheet, while the glass sheets sag together to a desired curvature;

allowing the glass sheets to cool;

separating the sag-bent glass sheets;

reversing the order of the sag-bent glass sheets so that said printed surface having that obscuration band is positioned to become the inner surface of the eventual outer sheet;

providing an array of electrical conductors on the convex surface of said second glass sheet;

placing the plastics interlayer over said conductors;

placing the reversed first glass sheet on said plastics interlayer with said surface having said printed obscuration band in contact with said plastics interlayer; and bonding said glass sheets to said plastics interlayer.

5. A method of manufacturing a laminated window for a vehicle, said window comprising inner and outer glass sheets which are laminated together with a plastics interlayer with electrical conductors incorporated in the laminate, the method comprising:

printing an obscuration band around the margin of the uppermost surface of a first glass sheet, which first glass sheet is to become the eventual outer sheet of the laminated window, and which printed surface having the obscuration band is to become the inner surface of that eventual outer sheet;

placing said first glass sheet on top of a second glass sheet, which second glass sheet is to become the eventual inner glass sheet of the laminated window, with said printed surface of the first glass sheet being uppermost and exposed;

heating the so assembled glass sheets in a sag bending furnace to fire the printed obscuration band on to said exposed uppermost surface of the first glass sheet, while the glass sheets sag together to a desired curvature;

allowing the glass sheets to cool;

separating the sag-bent glass sheets;

reversing the order of the sag-bent glass sheets so that said printed surface having that obscuration band is positioned to become the inner surface of the eventual outer sheet;

placing the plastics interlayer over said inner glass sheet;

providing an array of electrical conductors on the convex surface of the interlayer;

placing the reversed first glass sheet on said plastics interlayer with said surface having said printed obscuration band in contact with said plastics interlayer; and bonding said glass sheets to said plastics interlayer.

* * * * *